(12) United States Patent
Yuresko et al.

(10) Patent No.: US 12,538,116 B2
(45) Date of Patent: Jan. 27, 2026

(54) CELLULAR SERVICE ACTIVATION AND DEACTIVATION ON MOBILE DEVICES

(71) Applicant: JAMF Software, LLC, Minneapolis, MN (US)

(72) Inventors: Jonathan William Yuresko, Doylestown, PA (US); Joshua Jagdfeld, Minneapolis, MN (US)

(73) Assignee: JAMF Software, LLC, Minneapolis, MN (US)

( * ) Notice: Subject to any disclaimer, the term of this patent is extended or adjusted under 35 U.S.C. 154(b) by 463 days.

(21) Appl. No.: 18/305,621

(22) Filed: Apr. 24, 2023

(65) Prior Publication Data
US 2024/0107289 A1 Mar. 28, 2024

Related U.S. Application Data

(63) Continuation-in-part of application No. 17/934,608, filed on Sep. 23, 2022.

(51) Int. Cl.
*H04W 8/18* (2009.01)
*G06F 9/54* (2006.01)
(Continued)

(52) U.S. Cl.
CPC ............. *H04W 8/18* (2013.01); *G06F 9/546* (2013.01); *H04W 12/06* (2013.01); *H04W 12/30* (2021.01)

(58) Field of Classification Search
CPC ....... H04W 8/18; H04W 12/06; H04W 12/30; H04W 4/50; H04W 12/42; H04W 12/35;
(Continued)

(56) References Cited

U.S. PATENT DOCUMENTS 10,708,759 B1 * 7/2020 Roy ..................... H04W 8/183
2017/0048713 A1 * 2/2017 Guday ................... H04W 8/18
(Continued)

OTHER PUBLICATIONS

Non-Final Office Action issued in related U.S. Appl. No. 17/934,608, dated Nov. 19, 2024.
(Continued)

*Primary Examiner* — Wesley L Kim
*Assistant Examiner* — Erkin Abdullaev
(74) *Attorney, Agent, or Firm* — Benesch Friedlander Coplan & Aronoff LLP

(57) ABSTRACT

In certain aspects of the present disclosure, a computer-implemented method includes receiving, at a mobile device management server in response to authentication being granted to an organization app on a mobile device, an API enable message from an organization service associated with the organization app. The API enable message includes instructions for the mobile device management server to retrieve device and user data from the mobile device. The method includes retrieving, responsive to receiving the API enable message, the device and user data from the mobile device. The method includes transmitting the device and user data to the automation service for requesting activation of an organization owned line of service ESIM on the mobile device. The method includes deploying a management app and security posture to the mobile device based on the organization owned line of service ESIM being activated on the mobile device.

20 Claims, 8 Drawing Sheets

800

810
Receive, at a mobile device management server in response to authentication being granted to an organization app on a mobile device, an application programming interface (API) enable message from an organization service associated with the organization app, wherein the API enable message includes instructions for the mobile device management server to retrieve device and user data from the mobile device 812
Retrieve, responsive to receiving the API enable message, the device and user data from the mobile device 814
Transmit the device and user data to the automation service for requesting activation of an organization owned line of service ESIM on the mobile device 816
Deploy a management app and security posture to the mobile device based on the organization owned line of service ESIM being activated on the mobile device

(51) Int. Cl.
*H04W 12/06* (2021.01)
*H04W 12/30* (2021.01)

(58) Field of Classification Search
CPC ....... H04W 8/183; H04W 8/186; G06F 9/546; H04L 63/067
See application file for complete search history.

(56) References Cited

U.S. PATENT DOCUMENTS

| | | | |
|---|---|---|---|
| 2017/0250977 A1* | 8/2017 | Turner | H04W 12/102 |
| 2018/0206123 A1* | 7/2018 | Guday | H04W 8/18 |
| 2018/0270363 A1* | 9/2018 | Guday | H04W 4/24 |
| 2022/0014900 A1* | 1/2022 | Gandhi | H04W 12/40 |
| 2022/0086633 A1* | 3/2022 | Sureshlal | H04W 8/186 |
| 2022/0104005 A1* | 3/2022 | Xiong | H04W 12/45 |
| 2022/0141642 A1* | 5/2022 | Boyapalle | H04W 8/18 455/418 |
| 2024/0163657 A1* | 5/2024 | Williams | H04W 8/183 |
| 2025/0097688 A1 | 3/2025 | Orcutt | |

OTHER PUBLICATIONS

Non-Final Office Action issued in U.S. Appl. No. 17/934,608, dated Jul. 16, 2025.
Final Office Action issued in U.S. Appl. No. 17/934,608, dated Apr. 25, 2025.

* cited by examiner

CELLULAR SERVICE ACTIVATION AND DEACTIVATION ON MOBILE DEVICES

CROSS-REFERENCE TO RELATED APPLICATIONS

The present application is a continuation-in-part of U.S. patent application Ser. No. 17/934,608 entitled "Mobile Device Management of Personally Owned, Managed Devices," filed on Sep. 23, 2022, the disclosure of which is hereby incorporated by reference in its entirety for all purposes.

TECHNICAL FIELD

The present disclosure generally relates to mobile devices and management systems, and more specifically relates to cellular service activation and deactivation on mobile devices.

BACKGROUND

Organizations typically provide employees with devices for work that are owned by the organization. These organization owned devices can be automatically activated for cellular service and managed by the organization via a Device Management framework. Some organizations allow employees the option to use their personally owned devices for work instead. In such instances, the organization may want to have its owned line of cellular service activated on the personally owned device for security and/or pricing reasons, to name a few examples.

While it is possible for the organization to establish its owned line of cellular service on the personally owned device, it is a more laborious process, which may also require the employee to provide additional information. For example, the organization could utilize the second eSIM feature on the employee's personally owned device to deploy the organization owned line of cellular service on the personally owned device. In particular, to activate the personally owned device, it is standard practice to gather the device information, such as, for example, IMEI, EID, and serial number. Typically, the organization relies on the employee to accurately gather such device information and to accurately submit it. Once the cellular carrier of the organization owned line of cellular service receives the device information, it can take up to a week or longer for the cellular carrier to process, activate, and grant a line of cellular service to the personally owned device.

Traditionally, it takes a lengthy process to set up activation of a secured cellular network on a managed device, which can prevent organizations in certain industries from accomplishing efficient day-to-day tasks. Conventional activations can sometimes take up to a week to activate. Moreover, manual deactivations are required when disabling cellular service/ESIM on an already activated device. It is also cost prohibitive for organizations to pay for cellular service during non-work time periods.

The description provided in the background section should not be assumed to be prior art merely because it is mentioned in or associated with the background section. The background section may include information that describes one or more aspects of the subject technology.

SUMMARY

In particular aspects, the present disclosure provides systems and methods that allow for management and deployment of organization owned cellular lines of service to one or more personally owned, managed devices, which may be referred to as "managed bring-your-own (BYO)" devices. For example, in a corporate context, a company may want to activate its owned line of cellular service on one or more employee's personally owned, managed device that is used for work purposes. In such instances, the company can procure cellular lines of service from their cellular carrier without activating the cellular lines of service until needed. After procurement of the cellular lines of service that are currently inactive, the company can store the corresponding activation codes for later disbursement. For example, with the personally owned device (e.g., bring-your-own (BYO) device) enrolled with the company's device management framework (e.g., mobile device management server), the company can, either proactively or upon request from the employee of the now-managed, personally owned device (e.g., managed BYO device), provide one of the activation codes to the employee, which can be delivered in multiple formats such as, but not limited to, being bundled into an app that is opened on the managed BYO device, a scannable code format (e.g., QR code) for the managed BYO device to scan, or other format to activate the organization owned cellular line of service on the managed BYO device.

According to certain aspects of the present disclosure, a computer-implemented method is provided. The method includes receiving, at a mobile device management server from a carrier server, at least one activation code. The at least one activation code is associated with an inactive, organization owned cellular line of service. The method includes enrolling at least one personally owned device with the mobile device management server. After enrollment, the at least one personally owned device transitions from an unmanaged state to a managed state. The method also includes, responsive to the at least one personally owned device being enrolled, transmitting a message to a push notification server. The message initiates the at least one personally owned device, in the managed state, to communicate with the mobile device management server. The method includes, responsive to the at least one personally owned device, in the managed state, communicating with the mobile device management server, transmitting one activation code of the at least one activation code to the at least one personally owned device in the managed state.

According to other aspects of the present disclosure, a system is provided. The system includes a memory comprising instructions and a processor configured to receive, at a mobile device management server from a carrier server, at least one activation code. The at least one activation code is associated with an inactive, organization owned cellular line of service. The processor is configured to execute the instructions which, when executed, cause the processor to enroll at least one personally owned device with the mobile device management server. After enrollment, the at least one personally owned device transitions from an unmanaged state to a managed state. The processor is configured to execute the instruction which, when executed, cause the processor to, responsive to the at least one personally owned device being enrolled, transmit a message to a push notification server. The message initiates the at least one personally owned device, in the managed state, to communicate with the mobile device management server. The processor is configured to execute the instruction which, when executed, cause the processor to, responsive to the at least one personally owned device, in the managed state, communicating with the mobile device management server, transmit one activation code of the at least one activation code to the at least one personally owned device in the managed state.

According to other aspects of the present disclosure, a computer-implemented method is provided. The method includes receiving, at a mobile device management server from a carrier server, at least one activation code. The at least one activation code is associated with an inactive, organization owned cellular line of service. The method includes generating a unique code comprising one activation code of the at least one activation code. The method includes enrolling at least one personally owned device with the mobile device management server. After enrollment, the at least one personally owned device transitions from an unmanaged state to a managed state. The method also includes, responsive to the at least one personally owned device being enrolled, transmitting the unique code to another device associated with the at least one personally owned managed device in the managed state.

According to other aspects of the present disclosure, a system is provided. The system includes a memory comprising instructions and a processor configured to execute the instructions which, when executed, cause the processor to receive, at a mobile device management server from a carrier server, at least one activation code. The at least one activation code is associated with an inactive, organization owned cellular line of service. The processor is configured to execute the instructions which, when executed, cause the processor to generate a unique code comprising one activation code of the at least one activation code. The processor is configured to execute the instructions which, when executed, cause the processor to enroll at least one personally owned device with the mobile device management server. After enrollment, the at least one personally owned device transitions from an unmanaged state to a managed state. The processor is configured to execute the instruction which, when executed, cause the processor to, responsive to the at least one personally owned device being enrolled, transmit the unique code to another device associated with the at least one personally owned device in the managed device.

According to other aspects of the present disclosure, a computer-implemented method is provided. The method includes receiving, at a mobile device management server in response to authentication being granted to an organization app on a mobile device, an API enable message from an organization service associated with the organization app. The API enable message includes instructions for the mobile device management server to retrieve device and user data from the mobile device. The method includes retrieving, responsive to receiving the API enable message, the device and user data from the mobile device. The method includes transmitting the device and user data to an automation service for requesting activation of an organization owned line of service ESIM on the mobile device. The method includes deploying a management app and security posture to the mobile device based on the organization owned line of service ESIM being activated on the mobile device.

According to other aspects of the present disclosure, a system is provided. The system includes a memory comprising instructions and a processor configured to receive, at a mobile device management server in response to authentication being granted to an organization app on a mobile device, an Application Programming Interface (API) enable message from an organization service associated with the organization app. The API enable message includes instructions for the mobile device management server to retrieve device and user data from the mobile device. The processor is configured to execute the instructions which, when executed, cause the processor to retrieve, responsive to receiving the API enable message, the device and user data from the mobile device. The processor is configured to execute the instructions which, when executed, cause the processor to transmit the device and user data to an automation service for requesting activation of an organization owned line of service ESIM on the mobile device. The processor is configured to execute the instructions which, when executed, cause the processor to deploy a management app and security posture to the mobile device based on the organization owned line of service ESIM being activated on the mobile device.

According to other aspects of the present disclosure, a non-transitory machine-readable storage medium comprising machine-readable instructions for causing a processor to execute a method is provided. The method includes receiving, at a mobile device management server in response to authentication being granted to an organization app on a mobile device, an API enable message from an organization service associated with the organization app. The API enable message includes instructions for the mobile device management server to retrieve device and user data from the mobile device. The method includes retrieving, responsive to receiving the API enable message, the device and user data from the mobile device. The method includes transmitting the device and user data to an automation service for requesting activation of an organization owned line of service ESIM on the mobile device. The method includes deploying a management app and security posture to the mobile device based on the organization owned line of service ESIM being activated on the mobile device.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some organizations, such as in corporate environments, for example, employees are provided with organization owned devices to use for work. Often times, these organization owned devices are automatically activated for cellular service or are managed by the organization, via a Device Management framework, to activate cellular service through mobile device management commands sent to the organization owned devices. With these types of organization owned devices, activating cellular service is a fairly straight forward process.

As more organizations allow employees to bring their own device (e.g., BYO device) for work, the process for activating cellular service on these devices get more complicated. For example, an employee will need to enroll their BYO device with the organization's device management server and will need to gather and provide the BYO device information to the organization. Once the organization receives the BYO device information, the organization forwards that information to its cellular carrier (e.g., cellular provider) for processing. During processing, which may take anywhere from 24 hours to 72 hours or more, the cellular carrier generates an eSIM activated line of service based on the BYO device information and sends it to the organization. Depending on the particular cellular carrier, the BYO device is activated for cellular service over-the-air or the employee is directed to scan a QR code or use an Subscription Manager-Data Preparation (SM-DP+) Uniform Resource Locator (URL) to complete activation of the cellular service.

The disclosed technology provides a solution to such conventionally prolonged processes for activating organization owned cellular lines on personally owned BYO devices. For example, the disclosed technology enables an organization with the ability to simplify the process and reduce the time it takes to activate the organization owned cellular line on personally owned BYO devices.

The disclosed system addresses a technical problem tied to computer technology and arising in the realm of mobile device management, namely the technical problem of timely activating organization owned cellular lines of service on personally owned BYO devices. The disclosed system solves this technical problem by utilizing mobile device management functions to provide managed personally owned BYO devices with prepared activation codes to initiate immediate activation of the organization owned cellular service on such devices.

Figure 1:
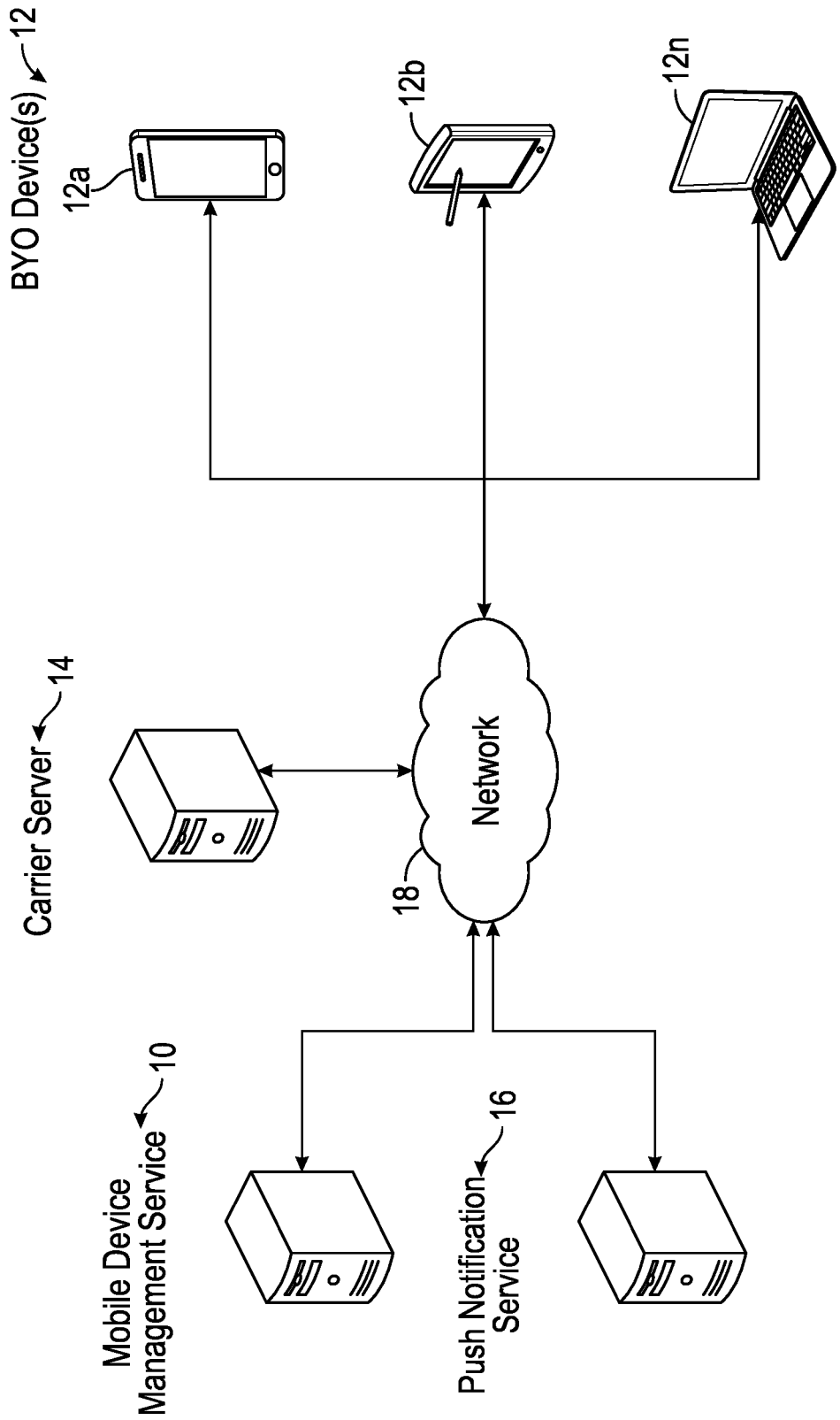
FIG. 1 illustrates an example architecture for mobile device management of personally owned, managed devices.

FIG. 1 illustrates an example architecture 100 for managing personally owned, managed devices. For example, the architecture 100 includes a mobile device management server 10, at least one bring-your-own (BYO) device 12, such as a first BYO device 12*a* and a second BYO device 12*b* to an nth BYO device 12*n*, a carrier server 14, and a push notification service 16 all connected over a network 18. In certain aspects, the mobile device management server 10 may be connected to the push notification service 16 over a separate network.

The mobile device management server 10 can be any device having an appropriate processor, memory, and communications capability for communicating with the at least one BYO device 12, the carrier server 14, and the push notification service 16. For purposes of load balancing, the mobile device management server 10 may include multiple servers. The carrier server 14 can be any device having an appropriate processor, memory, and communications capability for communicating with the mobile device management server 10 and the at least one BYO device 12. The push notification service 16 can be any device having an appropriate processor, memory, and communications capability for communicating with the mobile device management server 10 and the at least one BYO device 12. The at least one BYO device 12, such as the first BYO device 12*a* and the second BYO device 12*b*, to which the mobile device management server 10 communicates with over the network 18 via the push notification service 16, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management server 10, the carrier server 14, and the push notification service 16 can be a cloud computing server of an infrastructure-as-a-service (IaaS) and be able to support a platform-as-a-service (PaaS) and software-as-a-service (SaaS) services.

It should be noted that although two BYO devices, such as the first BYO device 12*a* and the second BYO device 12*b* (to the nth BYO device 12*n*), are shown in FIG. 1, the present disclosure is not limited to any particular configuration or number of devices. In certain aspects, a different number of BYO devices may be present.

The network 18 can include, for example, any one or more of a personal area network (PAN), a local area network (LAN), a campus area network (CAN), a metropolitan area network (MAN), a wide area network (WAN), a broadband network (BBN), the Internet, and the like. Further, the network 18 can include, but is not limited to, any one or more of the following network topologies, including a bus network, a star network, a ring network, a mesh network, a star-bus network, tree or hierarchical network, and the like.

Figure 2:
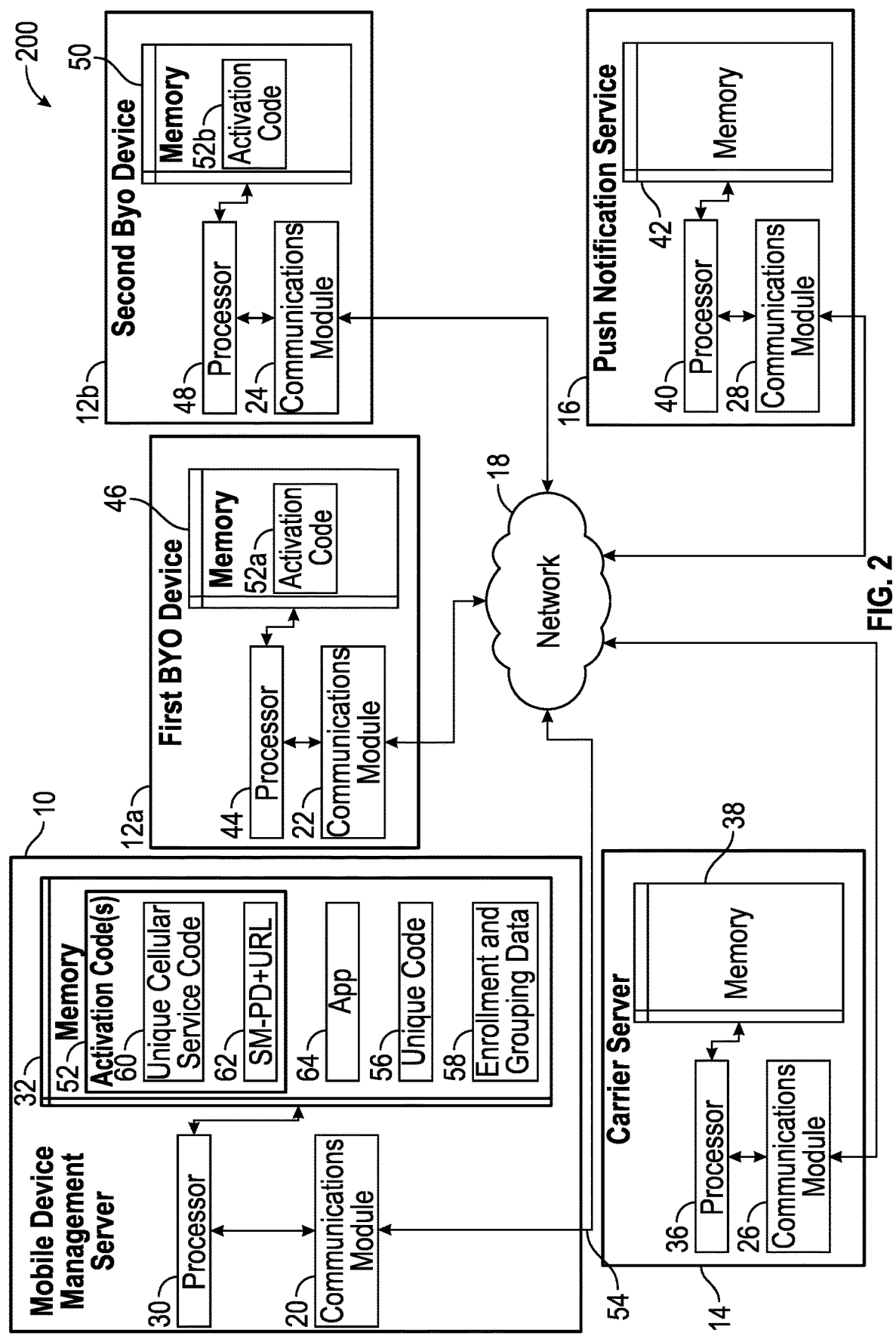
FIG. 2 is a block diagram illustrating the example personally owned, managed devices, mobile device management server, carrier server, and push notification service from the architecture of FIG. 1 according to certain aspects of the disclosure.

FIG. 2 is a block diagram illustrating examples of the mobile device management server 10, the first BYO device 12a, the second BYO device 12b, the carrier server 14, and the push notification service 16 in the architecture of FIG. 1 according to certain aspects of the disclosure. It should be understood that for purposes of explanation the first BYO device 12a and the second BYO device 12b are described, but any number of the at least one BYO device 12 could be used.

The mobile device management server 10, the first BYO device 12a, the second BYO device 12b, the carrier server 14, and the push notification service 16 are connected over the network 18 via respective communication modules 20, 22, 24, 26, 28. The communication modules 20, 22, 24, 26, 28 are configured to interface with the network 18 to send and receive information, such as data, requests, responses, and commands to other devices on the network 18. The communications modules 20, 22, 24, 26, 28 can be, for example, modems or Ethernet cards.

The mobile device management server 10 includes a processor 30, the communications module 20, and a memory 32 that includes a management module 34. The processor 30 of the mobile device management server 10 is configured to execute instructions, such as instructions physically coded into the processor 30, instructions received from software in the memory 32, or a combination of both.

The carrier server 14 includes a processor 36, the communications module 26, and a memory 38. The processor 36 of the carrier server 14 is configured to execute instructions, such as instructions physically coded into the processor 36, instructions received from software in the memory 38, or a combination of both.

The push notification service 16 includes a processor 40, the communications module 28, and a memory 42. The processor 40 of the push notification service 16 is configured to execute instructions, such as instructions physically coded into the processor 40, instructions received from software in the memory 42, or a combination of both.

The first BYO device 12a includes a processor 44, the communications module 22, and a memory 46. The processor 44 of the first BYO device 12a is configured to execute instructions, such as instructions physically coded into the processor 44, instructions received from software in the memory 46, or a combination of both. When the first BYO device 12a is in unenrolled with the mobile device management server 10 it is in an unmanaged state. On the other hand, after enrollment with the mobile device management server 10, the first BYO device 12a transitions from the unmanaged state to a managed state, where the mobile device management server 10 monitors and manages the first BYO device 12a under mobile device management functions.

The second BYO device 12b includes a processor 48, the communications module 24, and a memory 50. The processor 48 of the second BYO device 12b is configured to execute instructions, such as instructions physically coded into the processor 48, instructions received from software in the memory 50, or a combination of both. When the second BYO device 12b is unenrolled with the mobile device management server 10 it is in an unmanaged state. On the other hand, after enrollment with the mobile device management server 10, the second BYO device 12b transitions from the unmanaged state to a managed state, where the mobile device management server 10 monitors and manages the second BYO device 12b under mobile device management functions.

The mobile device management server 10 may correspond to hardware and/or software that implement mobile device management functions (e.g., Device Management framework). For example, in corporate, healthcare, and educational contexts, to name a few, the mobile device management server 10 can enroll, monitor, and manage employees' bring-your-own (BYO), personally owned devices, such as the first BYO device 12a and the second BYO device 12b, and allow for deployment of organization owned cellular lines of service on the managed BYO, personally owned devices. In certain aspects, the mobile device management server 10 may store (or access) enrollment and grouping data 58. The enrollment and grouping data 58 may include enrollee data identifying all mobile devices that are managed by the mobile device management server 10, such as data associated with the first BYO device 12a, and the second BYO device 12b to the nth BYO device 12n.

The mobile device management server 10 is configured to receive at least one activation code 52 from the carrier server 14. The at least one activation code 52 is associated with an inactive, organization owned cellular line of service. In certain aspects, each activation code of the at least one activation code 52 includes a unique cellular service code 60 and a Manager-Data Preparation (SM-DP+) Uniform Resource Locator (URL) 62. Each activation code of the at least one activation code 52 is restricted to a one-time activation of the inactive, organization owned cellular line of service. In certain aspects, after the mobile device management server 10 receives the at least one activation code 52, the mobile device management server 10 can store the at least one activation code 52 in the memory 32, in a separate database, or a combination of both.

The processor 30 of the mobile device management server 10 is configured enroll the at least one personally owned device, such as the first BYO device 12a and the second BYO device 12b, with the mobile device management server 10. After being enrolled with the mobile device management server 10, the at least one personally owned device transitions from an unmanaged state to a managed state, such that the mobile device management server 10 begins monitoring and managing the at least one personally owned device under mobile device management functions.

The mobile device management server 10 is configured to, responsive to the at least one personally owned device (e.g., the first BYO device 12a) being enrolled, transmit the message 54 to the push notification service 16. The message initiates the at least one personally owned device, in the managed state, to communicate with the mobile device management server 10. The mobile device management server 10 is configured to, responsive to the at least one personally owned device, in the managed state, communicating with the mobile device management server 10, transmit one activation code of the at least one activation code 52 to the at least one personally owned device in the managed state.

In certain aspects, the mobile device management server 10 is configured to generate a unique code 56, such as, for example, a QR code, which includes one activation code of the at least one activation code 52. In certain aspects, the mobile device management server 10 is configured to generate the unique code 56 to include, in addition to the one activation code of the at least one activation code 52, a unique string that associates the one activation code of the at least one activation code 52 to the particular BYO device, such as the first BYO device 12a. In such aspects, responsive to the at least one personally owned device (e.g., the first BYO device 12a) being enrolled, the mobile device management server 10 is configured to transmit the unique code 56 to another device associated with the at least one personally owned device in the managed state. In certain aspects, the unique code 56 can be transmitted via email, text, or other appropriate ways.

It should be noted that although various embodiments may be described herein with reference to corporate, healthcare, and educational settings, this is for example only and not to be considered limiting. The teachings of the present disclosure may be applied in any mobile device environments, including but not limited to home environments, corporate environments, educational environments, healthcare environments, retail environments, government environments, organization environments, and other appropriate environments.

Figure 3:
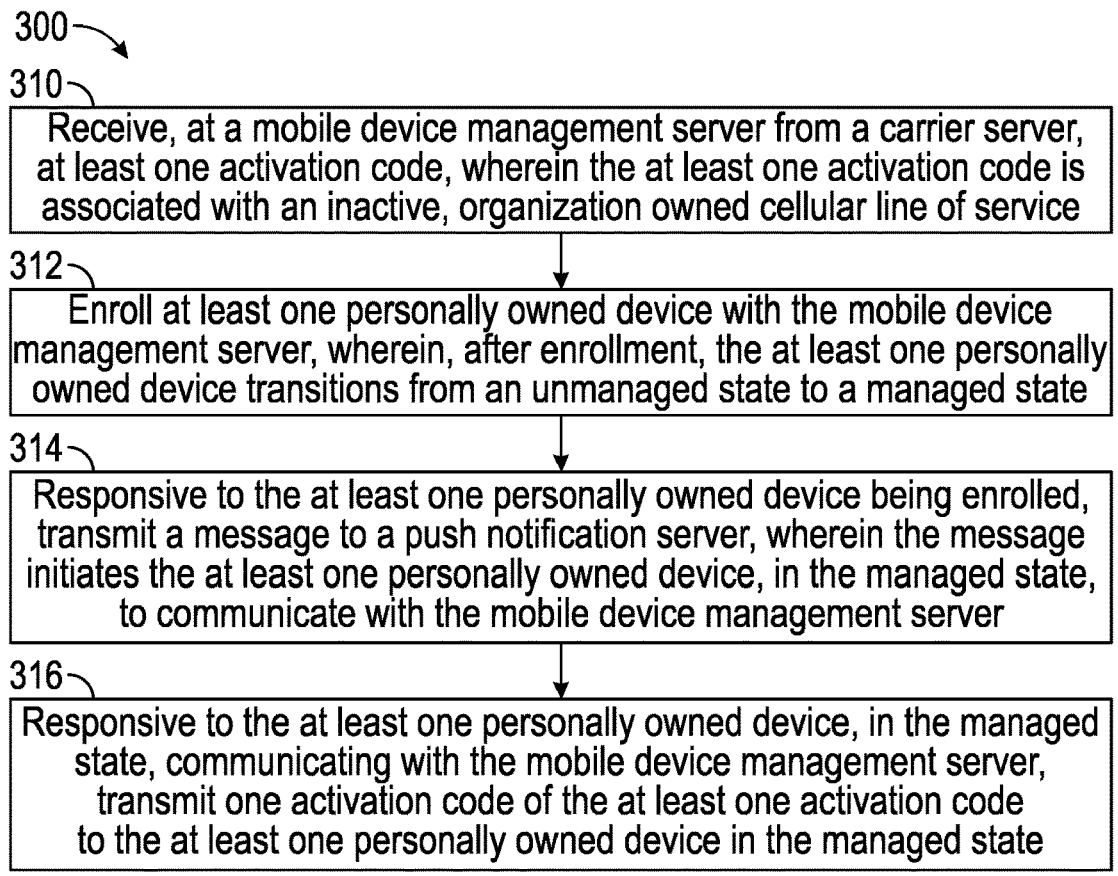
FIG. 3 illustrates an example process of mobile device management of personally owned, managed devices with reference to the example first managed device, second managed device, mobile device management server, carrier server, and push notification service of FIG. 2.

FIG. 3 illustrates an example process 300 using the mobile device management server 10, the first BYO device 12a, and, in certain aspects, the carrier server 14 and the push notification service 16 of FIG. 2. While FIG. 3 is described with reference to FIG. 2, it should be understood that the process steps of FIG. 3 may be performed by other systems.

The process 300 begins by proceeding to step 310 when the processor 30 of the mobile device management server 10 receives at least one activation code 52 from the carrier server 14. The at least one activation code 52 is associated with an inactive cellular line that an organization purchased from a cellular service carrier associated with the carrier server 14. As depicted at step 312, the processor 30 of the mobile device management server 10 enrolls at least one personally owned device (e.g., the first BYO device 12a) with the mobile device management server 10. After enrollment, the at least one personally owned device transitions from an unmanaged state to a managed state. In the managed state, the at least one personally owned device is monitored and managed by the mobile device management server 10 under a Device Management framework.

As depicted at step 314, responsive to the at least one personally owned device being enrolled, the processor 30 of the mobile device management server 10 transmits a message 54 to a push notification service 16, wherein the message 54 initiates the at least one personally owned device, in the managed state, to communicate with the mobile device management server 10. At step 318, responsive to the at least one personally owned device (e.g., the first BYO device 12a), in the managed state, communicating with the mobile device management server 10, the processor 30 of the mobile device management server 10 transmits one activation code of the at least one activation code 52 to the at least one personally owned device in the managed state.

Figure 4:
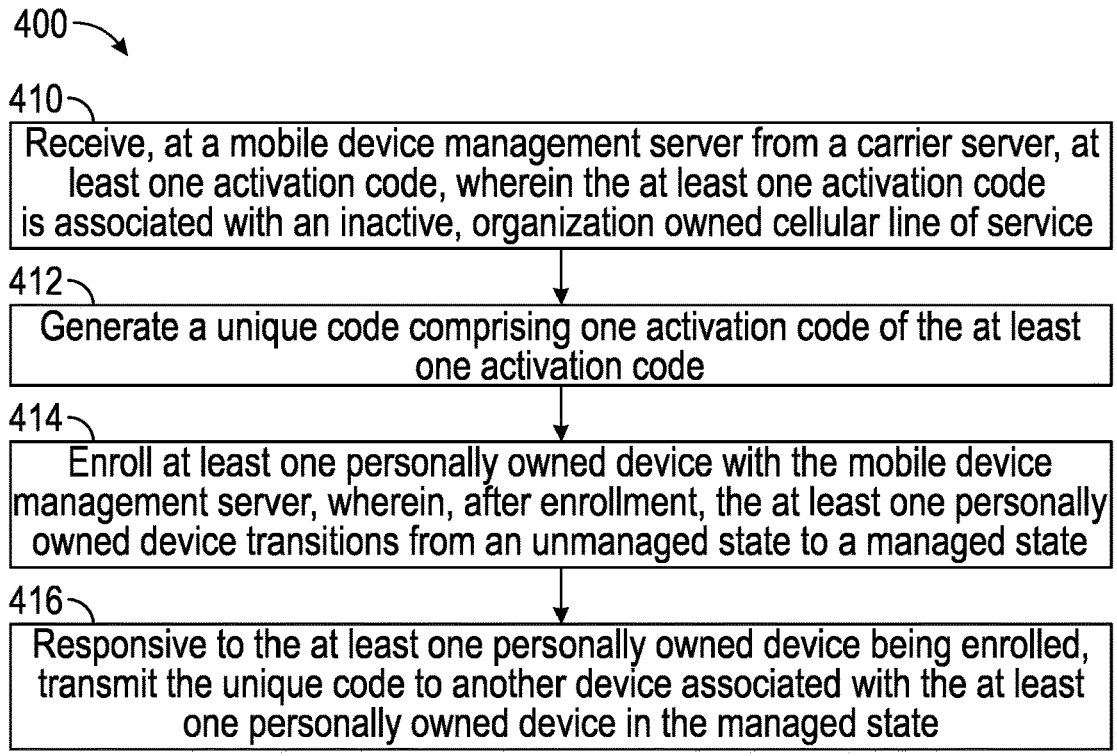
FIG. 4 illustrates another example process of mobile device management of personally owned, managed devices with reference to the example first managed device, second managed device, mobile device management server, carrier server, and push notification service of FIG. 2.

FIG. 4 illustrates an example process 400 using the mobile device management server 10, the first BYO device 12a, and, in certain aspects, the carrier server 14 and the push notification service 16 of FIG. 2. While FIG. 4 is described with reference to FIG. 2, it should be understood that the process steps of FIG. 4 may be performed by other systems.

The process 400 begins by proceeding to step 410 when the processor 30 of the mobile device management server 10 receives at least one activation code 52 from the carrier server 14. The at least one activation code 52 is associated with an inactive cellular line that an organization purchased from a cellular service carrier associated with the carrier server 14. As depicted at step 412, the processor 30 of the mobile device management server 10 generates a unique code 56 comprising one activation code of the at least one activation code 52.

At step 414, the processor 30 of the mobile device management server 10 enrolls at least one personally owned device (e.g., the first BYO device 12a) with the mobile device management server 10. After enrollment, the at least one personally owned device transitions from an unmanaged state to a managed state. In the managed state, the at least one personally owned device is monitored and managed by the mobile device management server 10 under a Device Management framework. As depicted at step 416, responsive to the at least one personally owned device being enrolled, the processor 30 of the mobile device management server 10 transmits the unique code 56 to another device associated with the at least one personally owned device in the managed state.

Examples will now be described with reference to the example process 300 of FIG. 3 and the example process 400 of FIG. 4.

In a corporate environment, for example, an organization can procure or purchase multiple cellular lines of service from a cellular carrier. These purchased lines of service are not activated until needed. For example, after purchase, the cellular carrier can provide at least one activation code 52 to the mobile device management server 10 associated with the organization. The organization can store the at least one activation code 52 in the memory 32 of the mobile device management server 10, in a separate database, or in a combination of both for later deployment to managed BYO devices. In certain instances, the cellular carrier can provide the at least one activation code 52 in the form of a string of characters, a QR code, or other appropriate codes.

As an example, when an employee brings his own device (e.g., the first BYO device 12a or the second BYO device 12b) to work, the organization requires the employee to enroll her personally owned BYO device with the mobile device management server 10. Once enrolled, the first BYO device 12a transitions from an unmanaged state to a managed state such that the mobile device management server 10 now monitors and manages the first BYO device 12a. With the first BYO device 12a in the managed state, the mobile device management server 10 initiates deployment of the at least one activation code 52 to the first BYO device 12a by transmitting the message 54 to the push notification service 16, which initiates communication between the mobile device management server 10 and the first BYO device 12a. Once communication is established, the mobile device management server 10 transmits the at least one activation code 52 to the first BYO device 12a. After receiving the at least one activation code 52, such as activation code 52a, the employee can implement the at least one activation code 52 on the first BYO device 12a to initiate activation of the organization owned cellular line of service. In certain instances, the at least one activation code 52 can be delivered in an app 64, which is generated by the mobile device management server 10. In such instances, the employee can open the app 64 and initiate activation of the organization owned cellular line of service.

As another example with reference to the second BYO device 12b, instead of providing the at least one activation code 52 (e.g., activation code 52b), in the app 64 or otherwise, the mobile device management server 10 generates a unique code 56 (e.g., QR code), which includes the at least one activation code 52, and transmits the unique code 56 to another device that is associated with the second BYO device 12b. In certain instances, the unique code 56 is transmitted via email. With the unique code 56 on another device, this allows the employee to use the second BYO device 12b to implement (e.g., scan) the unique code 56 to initiate activation of the organization owned cellular line of service.

Although certain embodiments and workflows are described herein with reference to performing mobile device management for a single managed device (e.g., personally owned BYO device in the managed state), it should be understood that mobile device management may also be performed for multiple devices, such as the first BYO device 12a and the second BYO device 12b to the nth BYO device 12n. In certain aspects, for example, the mobile device management server 10 can be configured to select multiple managed devices or a group of managed devices. The management message, such as the message 54, may identify multiple managed devices or a group of managed devices, and the push notification service 16 may send push notifications to each managed device.

Figure 5:
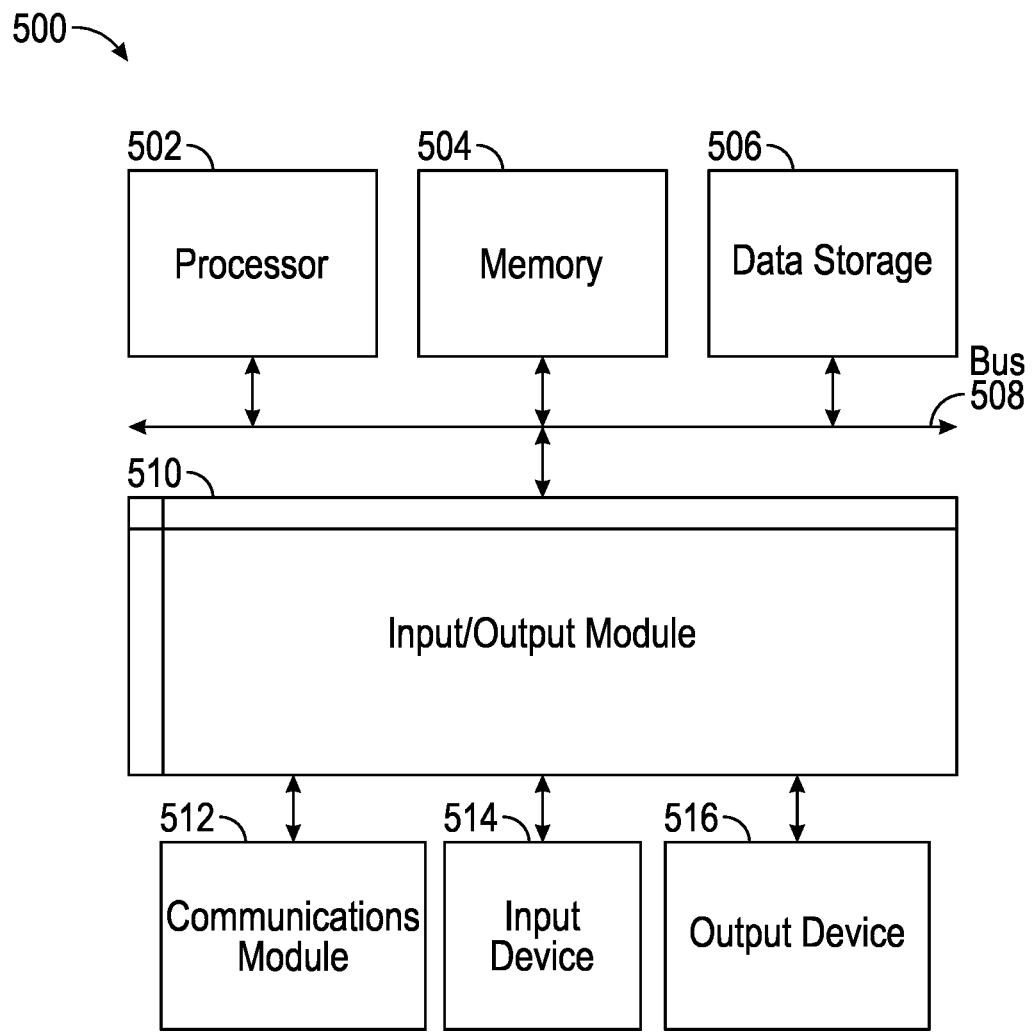
FIG. 5 is block diagram illustrating an example computer system with which the mobile device management server, first BYO device, second BYO device, carrier server, automation service, and push notification service of FIGS. 2 and 7 can be implemented.
Figure 7:
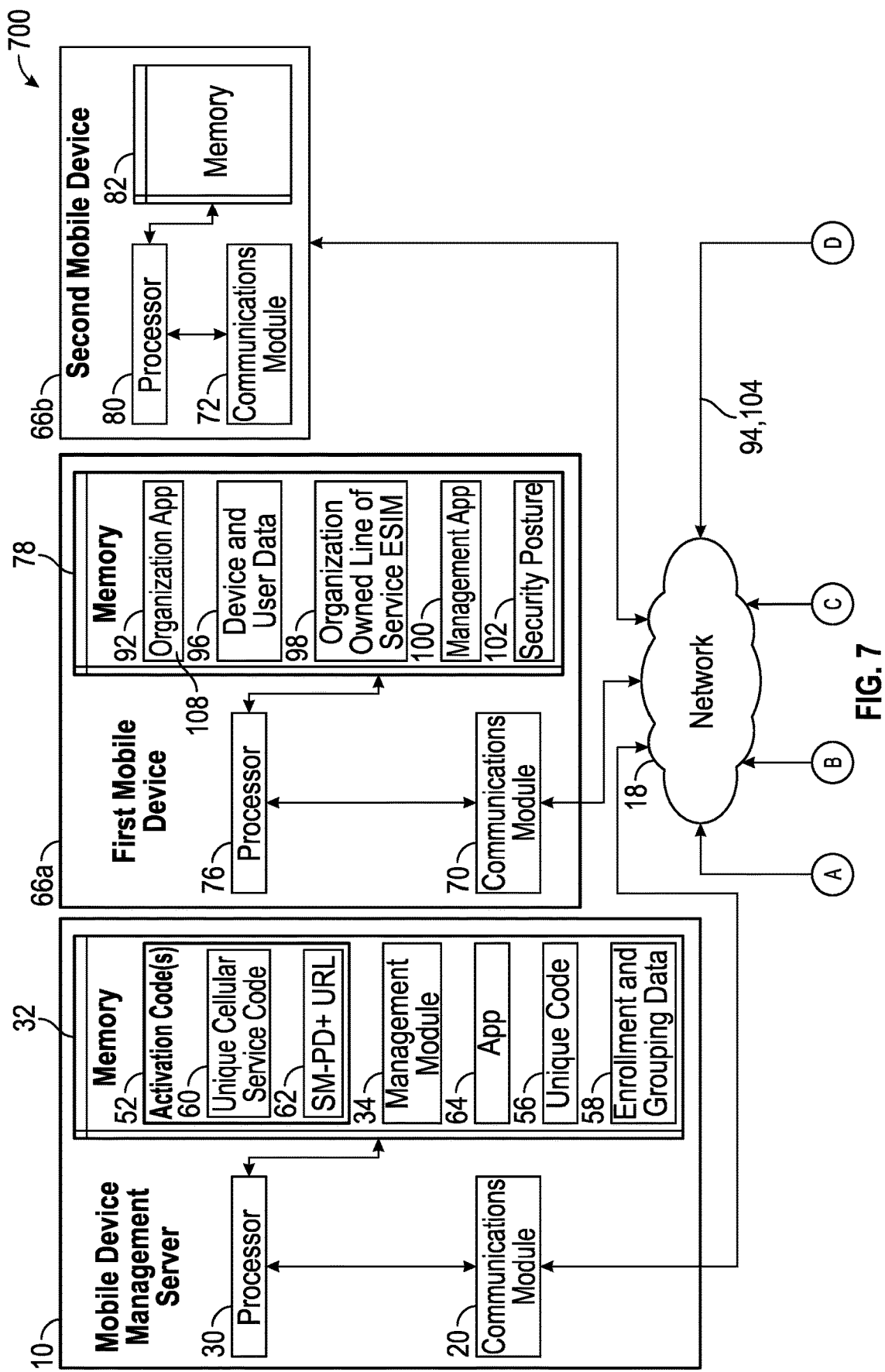
FIG. 7 is a block diagram illustrating the example mobile devices, mobile device management server, carrier server, automation service, and push notification service from the architecture of FIG. 1 according to certain aspects of the disclosure.
Figure 7:
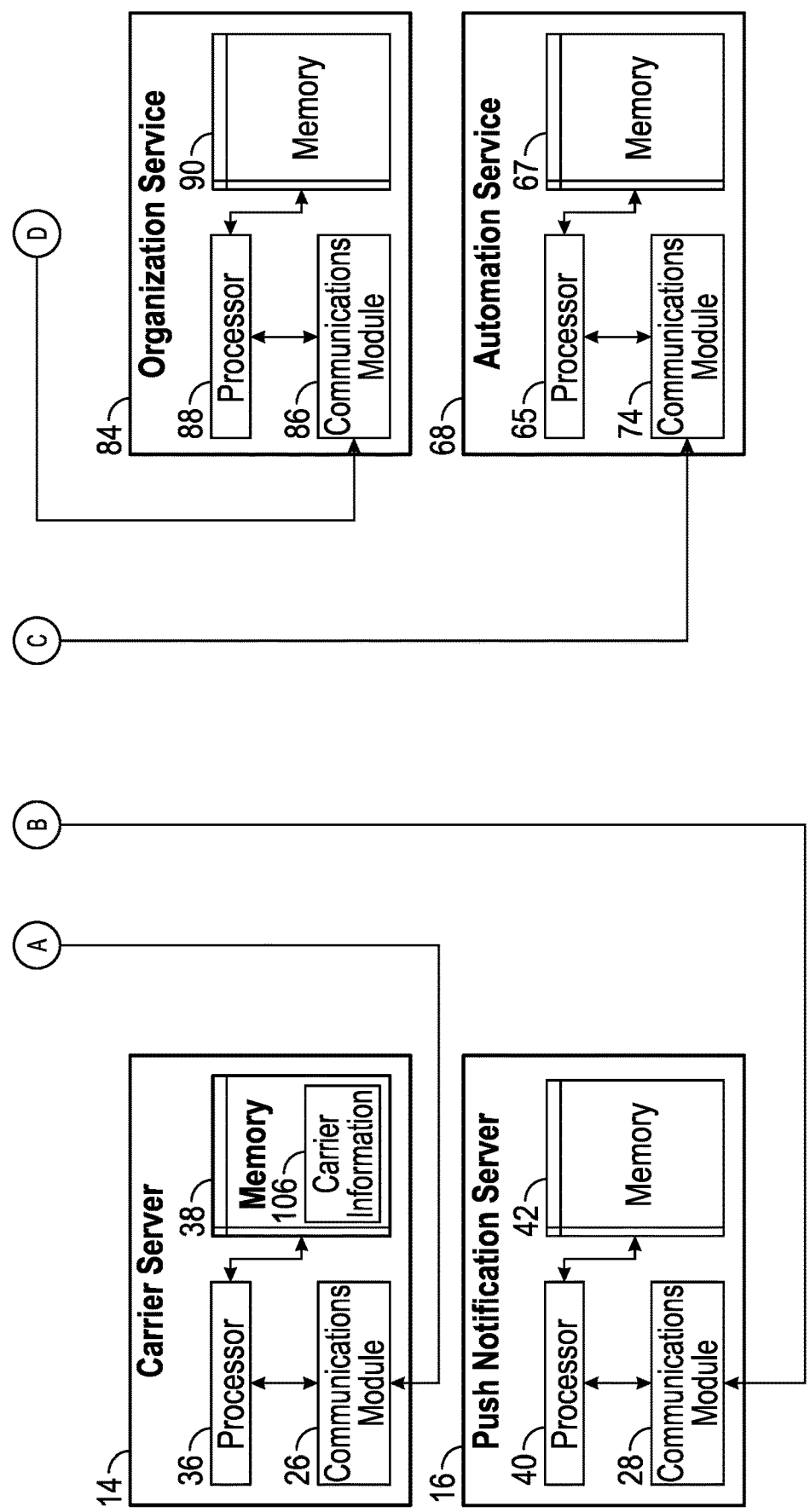

FIG. 5 is a block diagram illustrating an example computer system 500 with which the manager device 10, the first BYO device 12a, the second BYO device 12b, the mobile device management server 10, and the push notification service 16 illustrated in FIG. 2, as well as the first mobile device 66a, the second mobile device 66b, the automation service 68, and the organization service 84 illustrated in FIG. 7, can be implemented. In certain aspects, the computer system 500 may be implemented using hardware or a combination of software and hardware, either in a dedicated server, or integrated into another entity, or distributed across multiple entities.

Computer system 500 (e.g., the mobile device management server 10, the first BYO device 12a, the second BYO device 12b, the carrier server 14, the push notification service 16, the first mobile device 66a, the second mobile device 66b, the automation service 68, and the organization service 84) includes a bus 508 or other communication mechanism for communicating information, and a processor 502 (e.g., the processor 30, 36, 40, 44, 48, 65, 76, 80, 88) coupled with bus 508 for processing information. According to one aspect, the computer system 500 can be a cloud computing server of an IaaS that is able to support PaaS and SaaS services.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., the memory 32, 38, 42, 46, 50, 67, 78, 82, 90), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, e.g., one or more modules of computer program instructions encoded on a computer readable medium for execution by, or to control the operation of, the computer system 500.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, for wired communication in some implementations, or for wireless communication in other implementations, and multiple interfaces may also be used. The input/output module 510 is configured to connect to a communications module 512. Example communications modules 512 (e.g., the communications module 20, 22, 24, 26, 28, 70, 72, 74, 86) include networking interface cards, such as Ethernet cards and modems.

In certain aspects, the input/output module 510 is configured to connect to a plurality of devices, such as an input device 514 and/or an output device 516. Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device.

According to one aspect of the present disclosure the manager device 10, the first BYO device 12a, the second BYO device 12b, the mobile device management server 10, the push notification service 16, the first mobile device 66a, the second mobile device 66b, the automation service 68, and the organization service 84 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 508. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

Figure 6:
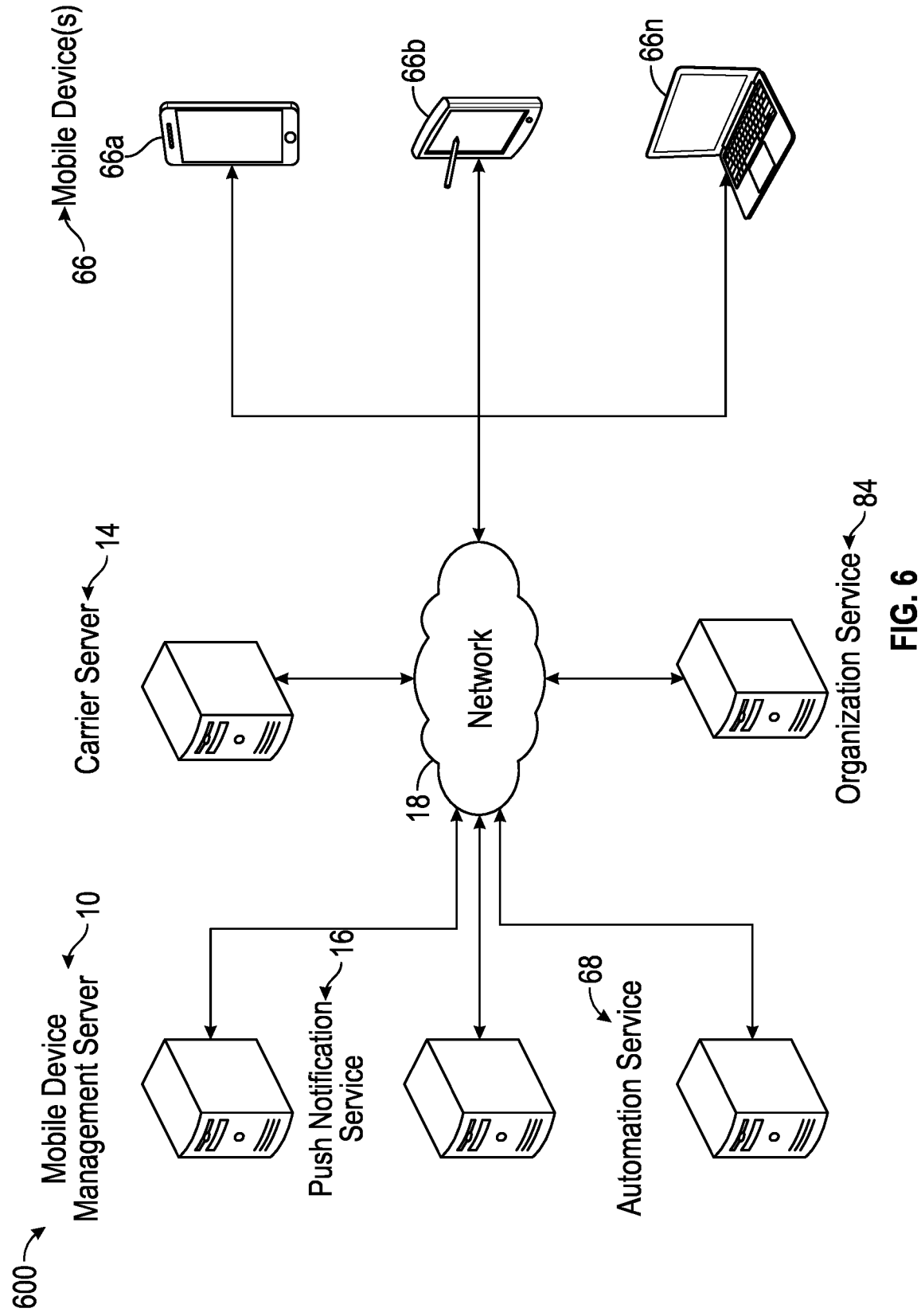
FIG. 6 illustrates an example architecture for cellular service activation and deactivation on mobile devices.
Figure 8:
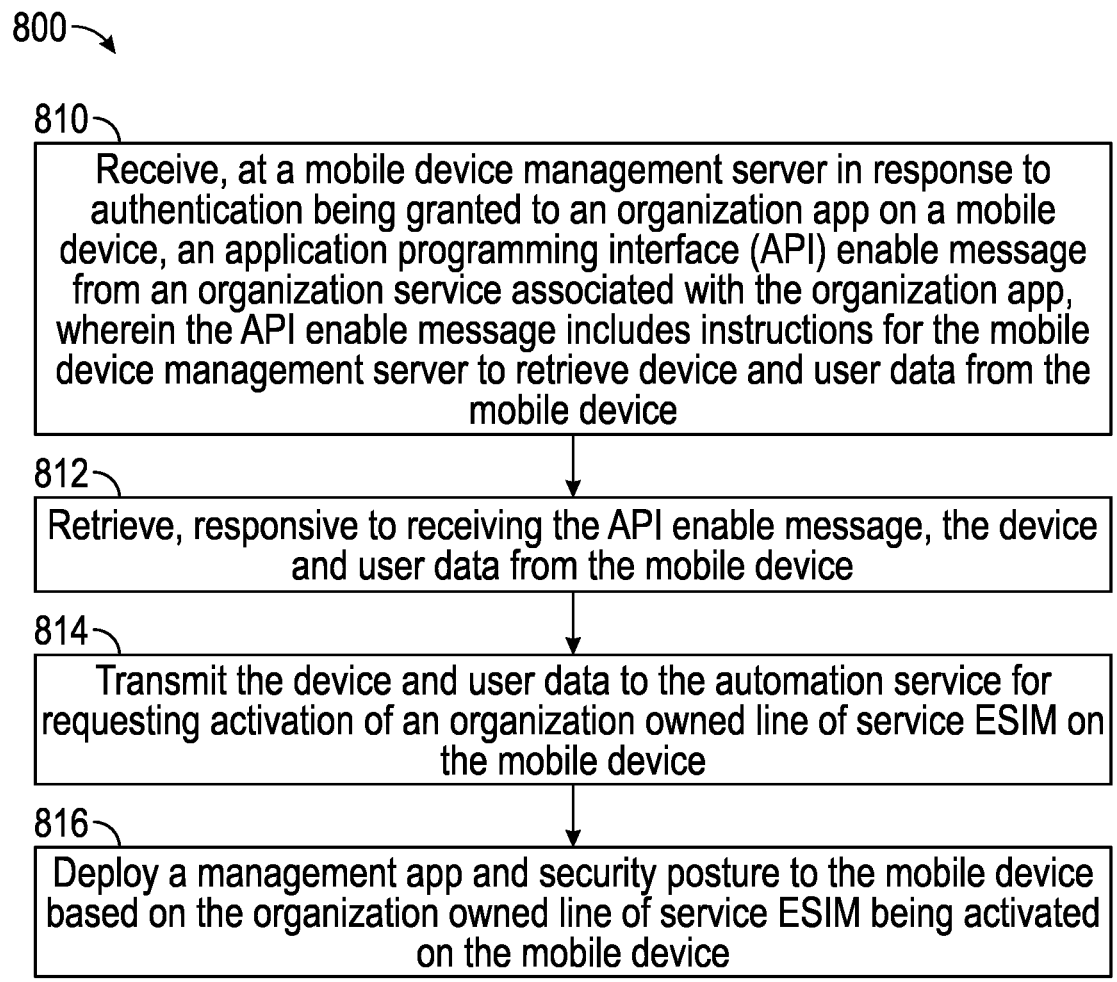
FIG. 8 illustrates an example process of cellular service activation and deactivation on mobile devices with reference to the example first managed device, second managed device, mobile device management server, carrier server, automation service, and push notification service of FIG. 7. In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

Furthermore, in other certain aspects of the present disclosure, reference is now made to FIGS. 6-8 for describing alternative aspects of the disclosed technology where like reference numerals denote like components, as described above, to omit explanation thereof.

FIG. 6 illustrates an example architecture 600 for cellular service activation and deactivation on mobile devices. For example, the architecture 600 includes a mobile device management server 10, at least one mobile device 66, such as a first mobile device 66*a* and a second mobile device 66*b* to an nth mobile device 66*n*, a carrier server 14, a push notification service 16, an automation service 68, and an organization service 84 all connected over a network 18. In certain aspects, the mobile device management server 10 may be connected to the push notification service 16 over a separate network.

The mobile device management server 10 can be any device having an appropriate processor, memory, and communications capability for communicating with the at least one mobile device 66, the carrier server 14, the push notification service 16, the automation service 68, and an organization service 84. For purposes of load balancing, the mobile device management server 10 may include multiple servers. The carrier server 14 can be any device having an appropriate processor, memory, and communications capability for communicating with the mobile device management server 10 and the at least one mobile device 66. The push notification service 16 can be any device having an appropriate processor, memory, and communications capability for communicating with the mobile device management server 10 and the at least one mobile device 66. The automation service 68 can be any device having an appropriate processor, memory, and communications capability for communicating with the mobile device management server 10, the carrier server 14, and the at least one mobile device 66. The organization service 84 can be any device having an appropriate processor, memory, and communications capability for communicating with the mobile device management server 10, the carrier server 14, and the at least one mobile device 66.

The at least one mobile device 66, such as the first mobile device 66*a* and the second mobile device 66*b*, to which the mobile device management server 10 communicates with over the network 18 via the push notification service 16, can be, for example, a tablet computer, a mobile phone, a mobile computer, a laptop computer, a portable media player, an electronic book (eBook) reader, or any other device having appropriate processor, memory, and communications capabilities. In certain aspects, the at least one mobile device 66 is a personally owned mobile device that is owned by an end user. In certain other aspects, the at least one mobile device 66 is an organization owned mobile device that is owned by an organization as opposed to an individual (e.g., personally owned). In certain aspects, the mobile device management server 10, the carrier server 14, and the push notification service 16 can be a cloud computing server of an infrastructure-as-a-service (IaaS) and be able to support a platform-as-a-service (PaaS) and software-as-a-service (SaaS) services.

It should be noted that although two mobile devices, such as the first mobile device 66a and the second mobile device 66b (to the nth mobile device 66n), are shown in FIG. 6, the present disclosure is not limited to any particular configuration or number of devices. In certain aspects, a different number of mobile devices may be present.

FIG. 7 is a block diagram illustrating examples of the mobile device management server 10, the first mobile device 66a, the second mobile device 66b, the carrier server 14, the push notification service 16, and the automation service 68 in the architecture of FIG. 6 according to certain aspects of the disclosure. It should be understood that for purposes of explanation the first mobile device 66a and the second mobile device 66b are described, but any number of the at least one mobile device 66 could be used.

The mobile device management server 10, the first mobile device 66a, the second mobile device 66b, the carrier server 14, the push notification service 16, the automation service 68, and the organization service 84 are connected over the network 18 via respective communication modules 20, 70, 72, 26, 28, 74, 86. The communication modules 20, 70, 72, 26, 28, 74, 86 are configured to interface with the network 18 to send and receive information, such as data, requests, responses, and commands to other devices on the network 18. The communications modules 20, 70, 72, 26, 28, 74, 86 can be, for example, modems or Ethernet cards.

The mobile device management server 10 includes the processor 30, the communications module 20, and the memory 32 that includes the management module 34. The processor 30 of the mobile device management server 10 is configured to execute instructions, such as instructions physically coded into the processor 30, instructions received from software in the memory 32, or a combination of both.

The carrier server 14 includes the processor 36, the communications module 26, and the memory 38. The processor 36 of the carrier server 14 is configured to execute instructions, such as instructions physically coded into the processor 36, instructions received from software in the memory 38, or a combination of both.

The push notification service 16 includes the processor 40, the communications module 28, and the memory 42. The processor 40 of the push notification service 16 is configured to execute instructions, such as instructions physically coded into the processor 40, instructions received from software in the memory 42, or a combination of both.

The automation service 68 includes a processor 65, the communications module 74, and the memory 67. The processor 65 of the automation service 68 is configured to execute instructions, such as instructions physically coded into the processor 65, instructions received from software in the memory 67, or a combination of both.

The organization service 84 includes a processor 88, the communications module 86, and a memory 90. The processor 88 of the organization service 84 is configured to execute instructions, such as instructions physically coded into the processor 88, instructions received from software in the memory 90, or a combination of both.

The first mobile device 66a includes a processor 76, the communications module 702, and a memory 78. The processor 44 of the first mobile device 66a is configured to execute instructions, such as instructions physically coded into the processor 76, instructions received from software in the memory 78, or a combination of both.

The second mobile device 66b includes a processor 80, the communications module 72, and a memory 82. The processor 80 of the second mobile device 66b is configured to execute instructions, such as instructions physically coded into the processor 80, instructions received from software in the memory 82, or a combination of both.

The mobile device management server 10 may correspond to hardware and/or software that implement mobile device management functions (e.g., Device Management framework). For example, in corporate, healthcare, and educational contexts, to name a few, the mobile device management server 10 can enroll, monitor, and manage mobile devices, such as the first mobile device 66a and the second mobile device 66b, and allow for activation and deactivation of organization owned cellular lines of service on the mobile devices, which may be personal owned device or organization owned devices. In certain aspects, the mobile device management server 10 may store (or access) the enrollment and grouping data 58. The enrollment and grouping data 58 may include enrollee data identifying all mobile devices that are managed by the mobile device management server 10, such as data associated with the first mobile device 66a, and the second mobile device 66b to the nth mobile device 66n.

The mobile device management server 10 is configured to receive, in response to authentication being granted to an organization app 92 on a first mobile device 66a, an Application Programming Interface (API) enable message 94 from an organization service 84 associated with the organization app 92. The API enable message 94 includes instructions for the mobile device management server 10 to retrieve device and user data 96 from the first mobile device 66a. The mobile device management server 10 is configured to retrieve, responsive to receiving the API enable message 94 from the organization service 84, the device and user data 96 from the mobile device. The mobile device management server 10 is configured to transmit the device and user data 96 to the automation service 68 for requesting activation of an organization owned line of service ESIM 98 on the first mobile device 66a. The mobile device management server 10 is configured to deploy a management app 100 and security posture 102 to the first mobile device 66a based on the organization owned line of service ESIM 98 being activated on the first mobile device 66a. In certain aspects, the security posture 102 is applied to device configurations and settings of the first mobile device 66a via the mobile device management server 10 specified by the organization. The security posture 102 can include, but is not limited to, network configurations such as, for example, Virtual Private Network (VPN) or content filtering, device configurations such as, for example, functionality restrictions, provisioning apps, and removing apps, and other appropriate device configurations and settings, either individually or in any combination.

In a similar process for deactivation of the organization owned line of service ESIM 98 from the first mobile device 66a, for example, the mobile device management server 10 is configured to receive, in response to a disable option being selected on the organization app 92 on the first mobile device 66a, an Application Programming Interface (API) disable message 104 from the organization service 84 associated with the organization app 92. The API disable message 104 includes instructions for the mobile device management server 10 to retrieve the device and user data 96 from the first mobile device 66a. The mobile device management server 10 is configured to retrieve, responsive to receiving the API disable message 104 from the organization service 84, the device and user data 96 from the first mobile device 66*a*. The mobile device management server 10 is configured to transmit the device and user data 96 to the automation service 68 for requesting deactivation of the organization owned line of service ESIM 98 on the first mobile device 66*a*. The mobile device management server 10 is configured to remove the management app 100 and security posture 102 from the mobile device based on the organization owned line of service ESIM 98 being deactivated on the first mobile device 66*a*.

In certain aspects, the mobile device management server 10 is configured to deploy the management app 100 and the security posture 102 to the first mobile device 66*a* based on the organization owned line of service ESIM 98 being activated on the first mobile device 66*a* and based on carrier information 106 being transmitted to the first mobile device 66*a* from the carrier server 14. In certain aspects, the carrier information 106 is transmitted to the first mobile device 66*a* from the carrier server 14 via the automation service 68. The carrier information 106 can include, but is not limited to, cellular network activation information such as, for example, Subscription Manager Data Preparation (SM-DP), Uniform Resource Locator (URL), activation code, eSIM identifying number, corporate line phone number, carrier name, network type, and other appropriate carrier information, either individually or in any combination.

It should be noted that although various embodiments may be described herein with reference to corporate, healthcare, and educational settings, this is for example only and not to be considered limiting. The teachings of the present disclosure may be applied in any mobile device environments, including but not limited to home environments, corporate environments, educational environments, healthcare environments, retail environments, government environments, organization environments, and other appropriate environments.

FIG. 8 illustrates an example process 800 using the mobile device management server 10, the first mobile device 66*a*, and, in certain aspects, the carrier server 14, the push notification service 16, and the automation service 68 of FIG. 7. While FIG. 8 is described with reference to FIG. 7, it should be understood that the process steps of FIG. 8 may be performed by other systems.

The process 800 begins by proceeding to step 810 when the processor 30 of the mobile device management server 10 receives, in response to authentication being granted to an organization app 92 on a first mobile device 66*a*, an Application Programming Interface (API) enable message 94 from an organization service 84 associated with the organization app 92. The API enable message 94 includes instructions for the mobile device management server 10 to retrieve device and user data 96 from the first mobile device 66*a*. As depicted at step 812, the processor 30 of the mobile device management server 10 retrieves, responsive to receiving the API enable message 94 from the organization service 84, the device and user data 96 from the mobile device.

As illustrated at step 814, the processor 30 of the mobile device management server 10 transmits the device and user data 96 to the automation service 68 for requesting activation of an organization owned line of service ESIM 98 on the first mobile device 66*a*. The processor 30 of the mobile device management server 10 deploys a management app 100 and security posture 102 to the first mobile device 66*a* based on the organization owned line of service ESIM 98 being activated on the first mobile device 66*a*.

In a similar process for deactivation of the organization owned line of service ESIM 98 from the first mobile device 66*a*, the processor 30 of the mobile device management server 10 receives, in response to a disable option being selected on the organization app 92 on the first mobile device 66*a*, an Application Programming Interface (API) disable message 104 from the organization service 84 associated with the organization app 92. The API disable message 104 includes instructions for the mobile device management server 10 to retrieve the device and user data 96 from the first mobile device 66*a*. The processor 30 of the mobile device management server 10 retrieves, responsive to receiving the API disable message 104 from the organization service 84, the device and user data 96 from the first mobile device 66*a*. The processor 30 of the mobile device management server 10 transmits the device and user data 96 to the automation service 68 for requesting deactivation of the organization owned line of service ESIM 98 on the first mobile device 66*a*. The processor 30 of the mobile device management server 10 removes the management app 100 and security posture 102 from the mobile device based on the organization owned line of service ESIM 98 being deactivated on the first mobile device 66*a*.

Examples will now be described with reference to the example process 800 of FIG. 8.

In examples where the at least one mobile device 66 is a personally owned device, the user may require cellular service on the at least one mobile device 66 while working for a ride sharing company or a delivery organization, as non-limiting examples. The company or organization may prefer to provide line of cellular service, such as the organization owned line of service ESIM 98, to the at least one mobile device 66, but only while the user is working (e.g., "on the clock"). Prior to starting a work shift, the user will enroll the at least one mobile device 66 with the organization, which will result in an organization app 92 being installed on the at least one mobile device 66. At the start of a work shift, the user logs into the organization app 92 (such that the user is authenticated to the at least one mobile device 66), which can trigger a time clock 108, to start tracking the work shift. By logging in to organization app 92, the user will be prompted to install the organization owned line of service ESIM 98 onto the at least one mobile device 66. With the user authenticated to the at least one mobile device 66 via the organization app 92, the organization service 84 associated with the organization app 92 transmits the API enable message 94 to the mobile device management server 10.

In response to receiving the API enable message 94, the mobile device management server 10 retrieves the device and user data 96 from the at least one mobile device 66. The mobile device management server 10 then transmits the device and user data 96 to the automation service 68, which requests the carrier server 14 to activate the organization owned line of service ESIM 98 on the at least one mobile device 66. The carrier information 106 is transmitted to the at least one mobile device 66, either via the carrier server 14 or via the automation service 68, for activation of the organization owned line of service ESIM 98 on the at least one mobile device 66. The user then completes activation of the organization owned line of service ESIM 98 on the at least one mobile device 66 such that the second ESIM is activated. Responsive to activation of the organization owned line of service ESIM 98 on the at least one mobile device 66, the mobile device management server 10 deploys the management app 100 and the security posture 102 to the at least one mobile device 66, which ensures that all traffic that is related to the organization securely goes through the organization owned line of service ESIM 98.

The user can end the work shift (e.g., "clock out") via the organization app 92 (e.g., selecting a disable option or similar manner), which triggers transmission of the API disable message 104 to the mobile device management server 10 with instructions to retrieve the device and user data 96 from the at least one mobile device 66. In response to receiving the API disable message 104, the mobile device management server 10 retrieves the device and user data 96 from the at least one mobile device 66. The mobile device management server 10 then transmits the device and user data 96 to the automation service 68, which requests the carrier server 14 to deactivate the organization owned line of service ESIM 98 on the at least one mobile device 66. The carrier server 14 then transmits the carrier information 106 to the at least one mobile device 66 to deactivate the organization owned line of service ESIM 98 on the at least one mobile device 66. Based on the organization owned line of service ESIM 98 on the at least one mobile device 66 being deactivated, the mobile device management server 10 removes the management app 100 and the security posture 102 from the at least one mobile device 66.

Activation and deactivation of the organization owned line of service ESIM 98 can similarly be done on mobile devices 66 that are organization owned. For example, in a hospitality or car rental scenario, a guest or customer of a hotel or can rental company may chose to get a mobile phone, such as the at least one mobile phone 66, when travelling abroad. The at least one mobile phone 66 will be managed by the organization as well as the cellular service. The organization can selectively activate and deactivate the organization owned line of service ESIM 98 on the at least one mobile device 66 based on various criteria including, but not limited to, checking into the hotel or car, checking out of the hotel or car, time period, and other appropriate criteria. For instance, the organization owned line of service ESIM 98 will remain activated on the at least one mobile device 66 until the device is returned to the organization. Once returned, the organization owned line of service ESIM 98 will be deactivated on the at least one mobile device 66, and awaits the next guest or customer.

Contractor and on-site shared devices are other example scenarios of when the at least one mobile device 66 is an organization owned device. For example, not all users at an organization are always issued company devices. Using this method of on-demand cellular network, organizations can have a cart of non-cellular activated devices and only when a contractor gets onsite or a user needs cellular service, they can activate the line on a device they just picked up for the first time and deactivate when they are leaving the site.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method comprising:
   receiving, at a mobile device management server in response to authentication being granted to an organization app on a mobile device, an Application Programming Interface (API) enable message from an organization service associated with the organization app, wherein the API enable message includes instructions for the mobile device management server to retrieve device and user data from the mobile device;
   retrieving, responsive to receiving the API enable message, the device and user data from the mobile device;
   transmitting the device and user data to an automation service for requesting activation of an organization owned line of service ESIM on the mobile device; and
   deploying a management app and security posture to the mobile device based on the organization owned line of service ESIM being activated on the mobile device.

2. The computer-implemented method of claim 1, wherein the organization app comprises a time clock.

3. The computer-implemented method of claim 2, wherein deploying the management app and security posture to the mobile device based on the organization owned line of service ESIM being activated on the mobile device is further based on carrier information being transmitted to the mobile device from a carrier server.

4. The computer-implemented method of claim 2, wherein deploying the management app and security posture to the mobile device based on the organization owned line of service ESIM being activated on the mobile device is further based on carrier information being transmitted to the mobile device from a carrier server via the automation service.

5. The computer-implemented method of claim 3, further comprising:
   receiving, at the mobile device management server in response to a disable option being selected on the organization app on the mobile device, an Application Programming Interface (API) disable message from the organization service associated with the organization app, wherein the API disable message includes instructions for the mobile device management server to retrieve the device and user data from the mobile device;
   retrieving, responsive to receiving the API disable message, the device and user data from the mobile device;
   transmitting the device and user data to the automation service for requesting deactivation of the organization owned line of service ESIM on the mobile device; and
   removing the management app and security posture from the mobile device based on the organization owned line of service ESIM being deactivated on the mobile device.

6. The computer-implemented method of claim 5, wherein the mobile device is a personally owned device.

7. The computer-implemented method of claim 5, wherein the mobile device is an organization owned device.

8. A system comprising:
   a memory comprising instructions; and
   a processor configured to execute the instructions which, when executed, cause the processor to:
      receive, at a mobile device management server in response to authentication being granted to an organization app on a mobile device, an Application Programming Interface (API) enable message from an organization service associated with the organization app, wherein the API enable message includes instructions for the mobile device management server to retrieve device and user data from the mobile device;
      retrieve, responsive to receiving the API enable message, the device and user data from the mobile device;
      transmit the device and user data to an automation service for requesting activation of an organization owned line of service ESIM on the mobile device; and
      deploy a management app and security posture to the mobile device based on the organization owned line of service ESIM being activated on the mobile device.

9. The system of claim 8, wherein the organization app comprises a time clock.

10. The system of claim 9, wherein the processor is configured to execute the instructions to deploy the management app and security posture to the mobile device based on the organization owned line of service ESIM being activated on the mobile device to be further based on carrier information being transmitted to the mobile device from a carrier server.

11. The system of claim 9, wherein the processor is configured to execute the instructions to deploy the management app and security posture to the mobile device based on the organization owned line of service ESIM being activated on the mobile device to be further based on carrier information being transmitted to the mobile device from a carrier device via the automation service.

12. The system of claim 8, wherein the processor is further configured to execute the instructions which, when executed, cause the processor to:
   receive, at the mobile device management server in response to a disable option being selected on the organization app on the mobile device, an Application Programming Interface (API) disable message from the organization service associated with the organization app, wherein the API disable message includes instructions for the mobile device management server to retrieve the device and user data from the mobile device;

retrieve, responsive to receiving the API disable message, the device and user data from the mobile device;

transmit the device and user data to the automation service for requesting deactivation of the organization owned line of service ESIM on the mobile device; and remove the management app and security posture from the mobile device based on the organization owned line of service ESIM being deactivated on the mobile device.

13. The system of claim 12, wherein the mobile device is a personally owned device.

14. The system of claim 12, wherein the mobile device is an organization owned device.

15. A non-transitory machine-readable storage medium comprising machine-readable instructions for causing a processor to execute a method, the method comprising:

receiving, at a mobile device management server in response to authentication being granted to an organization app on a mobile device, an Application Programming Interface (API) enable message from an organization service associated with the organization app, wherein the API enable message includes instructions for the mobile device management server to retrieve device and user data from the mobile device;

retrieving, responsive to receiving the API enable message, the device and user data from the mobile device;

transmitting the device and user data to an automation service for requesting activation of an organization owned line of service ESIM on the mobile device; and deploying a management app and security posture to the mobile device based on the organization owned line of service ESIM being activated on the mobile device.

16. The non-transitory machine-readable storage medium of claim 15, wherein deploying the management app and security posture to the mobile device based on the organization owned line of service ESIM being activated on the mobile device is further based on carrier information being transmitted to the mobile device from a carrier server.

17. The non-transitory machine-readable storage medium of claim 15, wherein deploying the management app and security posture to the mobile device based on the organization owned line of service ESIM being activated on the mobile device is further based on carrier information being transmitted to the mobile device from a carrier server via the automation service.

18. The non-transitory machine-readable storage medium of claim 15, further including instructions for causing the processor to execute the method comprising:

receiving, at the mobile device management server in response to a disable option being selected on the organization app on the mobile device, an Application Programming Interface (API) disable message from the organization service associated with the organization app, wherein the API disable message includes instructions for the mobile device management server to retrieve the device and user data from the mobile device;

retrieving, responsive to receiving the API disable message, the device and user data from the mobile device;

transmitting the device and user data to the automation service for requesting deactivation of the organization owned line of service ESIM on the mobile device; and removing the management app and security posture from the mobile device based on the organization owned line of service ESIM being deactivated on the mobile device.

19. The non-transitory machine-readable storage medium of claim 18, wherein the mobile device is a personally owned device.

20. The non-transitory machine-readable storage medium of claim 18, wherein the mobile device is an organization owned device.

* * * * *